United States Patent [19]

Haugen et al.

[11] Patent Number: 5,546,091

[45] Date of Patent: Aug. 13, 1996

[54] PSUEDO-COLOR DISPLAY FOR ENHANCED VISUAL TARGET DETECTION

[75] Inventors: Marc D. Haugen, Rosamond; Robin L. Morelock, Torrance, both of Calif.

[73] Assignee: Hughes Aircraft Company, Los Angeles, Calif.

[21] Appl. No.: 344,767

[22] Filed: Nov. 23, 1994

[51] Int. Cl.$^6$ .............................. G01S 13/00; G01S 7/06
[52] U.S. Cl. .......................................... 342/181; 342/176
[58] Field of Search .................................. 342/176, 181; 345/22, 153, 154, 199; 395/100

[56] References Cited

U.S. PATENT DOCUMENTS

| | | | |
|---|---|---|---|
| 3,665,408 | 5/1972 | Erdahl et al. | 345/139 |
| 4,975,861 | 12/1990 | Fujimoto | 345/153 |
| 5,124,688 | 6/1992 | Rumball | 345/154 |
| 5,442,379 | 8/1995 | Bruce et al. | 345/153 |

OTHER PUBLICATIONS

"Synthetic Aperture Radar Image Processing Techniques Development and Evaluation," Final Report No. AFAL–TR–77–113, prepared by Hughes Aircraft Company for the Air Force Avionic Laboratory.

Rosenfeld et al, "Digital Picture Processing", Academic Press, Inc., second edition, vol. 1, p. 62.

*Primary Examiner*—Ian J. Lobo
*Attorney, Agent, or Firm*—Leonard A. Alkov; Wanda K. Denson-Low

[57] ABSTRACT

A pseudo-color display useful for enhanced target detection of two-dimensional images such as SAR data. The system includes a color display apparatus responsive to red, green and blue display control signals, and apparatus responsive to the input image data for remapping the respective input data for each pixel comprising the input image into respective red, green and blue display control signals in accordance with respective nonlinear red, green and blue remapping functions dependent on a single intensity threshold. This apparatus can include respective look-up tables stored in memory for each color, to be addressed by the respective pixel values. The display in one form also includes an image data processor which analyzes the input image data to adaptively select the intensity threshold, and calculate the respective remapping function values.

19 Claims, 4 Drawing Sheets

----- RED
——— GREEN
—·—· BLUE

PSUEDO-COLOR DISPLAY FOR ENHANCED VISUAL TARGET DETECTION

BACKGROUND OF THE INVENTION

The present invention relates to display apparatus, and more particularly to display for enhanced radar image interpretation.

Radar images can be fed to a cathode ray tube display for display, e.g., to an aircraft crew member. Synthetic aperture radar (SAR) images are often stored in log-detected format. Direct display of the logarithm of SAR image intensity expands the dynamic range of the background terrain, but compresses the dynamic range of bright discretes.

One problem in image interpretation of the displayed imagery is to quickly locate or distinguish targets. One known technique for enhancing the radar image interpretation is grey level intensity remapping ("GLIR").

GLIR is a function applied to image intensity. Intensity remapping can enhance visual target detection making it less time consuming. FIG. 1 shows a plot of an exemplary GLIR function. In FIG. 1, T is the threshold value and $S_1$ is the intensity where the slope of the GLIR function is one. Intensities between zero and $S_1$ are compressed into a smaller dynamic range. Intensities between $S_1$ and T are expanded into a larger dynamic range. Any intensity greater than T is saturated into the maximum intensity value (255 for eight-bit pixels). The intensity values between zero and $S_1$ are assumed to be background. To gain dynamic range for target detection some background detail (context) is sacrificed. The intensity values between T and 255 are assumed to be targets. All target detail is discarded to gain greater dynamic range for target detection. The pixels with intensity values between $S_1$ and T are possible targets. The dynamic range of this region is expanded so that the targets can be found more quickly.

Another interpretation enhancement technique is pseudo-coloring or color segmentation. For a reference describing several monochromatic and pseudo-coloring techniques, see "Synthetic Aperture Radar Image Processing Techniques Development and Evaluation," Final Report Number AFAL-TR-77-113, prepared by Hughes Aircraft Company for the Air Force Avionic Laboratory, Wright Patterson Air Force Base, Ohio. Pseudo-coloring remaps each pixel intensity into, for example, three new intensity values. These three remapped values are used to control the intensity of the color guns (one red, one green, one blue) of a color cathode ray tube (CRT).

A primary goal in using pseudo-color techniques is to enhance visual target detection without losing image detail. Visual target detection enhancement is achieved by color transitions. For example, in some known pseudo-color techniques, green is selected for low intensity returns (background), yellow for medium intensity returns (possible targets), and white for high intensity returns (targets and corner reflectors). Most of the image is low intensity returns. Green is typically selected for this region because visual detection thresholds are color dependent; the human visual system is more sensitive to green. For a reference discussing this phenomenon, see "Digital Picture Processing," A. Rosenfeld et al., Academic Press, Inc., 1982, second edition, volume 1, at page 62. Yellow is typically selected for medium intensity returns to create a green-phosphor display effect (some earlier green phosphor CRT display turned yellow at high intensities). White is typically selected for very high intensity returns to identify corner reflectors and very high intensity targets. Given the choice of color combinations, various mappings from pixel intensity to the desired color set have been employed.

Two common color segmentation algorithms are shown in FIGS. 2 and 3. FIG. 2 shows a pseudo-color remapping that gives the maximum expansion of the dynamic range. This remapping creates artificial color boundaries and artificial intensity boundaries at the intensity thresholds at T1 and T2. Artificial boundaries are created by discontinuous changes in color and intensity. The remapping shown in FIG. 3 also produces artificial color boundaries, but not artificial intensity boundaries. These abrupt changes in color and intensity distract the viewer from the real targets.

It would therefore represent an advance in the art to provide a pseudo-color remapping that would make continuous changes in intensity and color.

It is a general object of the invention to provide a pseudo-color display which enhances the visual detection of targets.

A further object is to provide a pseudo-color display which provides gradual color and intensity transitions.

Additional objects of the invention are to provide a pseudo-color display employing a green-yellow-white color remapping, using green as the primary (background) color, which requires only one intensity threshold and retains the image background.

SUMMARY OF THE INVENTION

A pseudo-color display apparatus for the display of image data employs pseudo-color remapping to enhance image interpretation. The apparatus includes a color display apparatus such as a color CRT responsive to red, green and blue display control signals. In accordance with the invention, the display apparatus comprises means responsive to the input image data for remapping the respective input data for each pixel comprising the input image into respective red, blue and green display control signals in accordance with respective nonlinear red, green and blue remapping functions dependent on a single threshold value. The color display apparatus is responsive to the red, green and blue display control signals to display the image in pseudo-color. In the preferred embodiment, the remapping functions and the threshold are selected such that the image background is displayed as green, and targets are displayed in yellow, with corner reflectors and other high intensity returns displayed in white. The remapping functions are further selected to provide an image display which provides gradual color and intensity transitions.

For certain applications, the display apparatus further comprises an image data processor responsive to the input image data for adaptively selecting the threshold value in dependence on predetermined characteristics of the image.

BRIEF DESCRIPTION OF THE DRAWINGS

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figure 1:
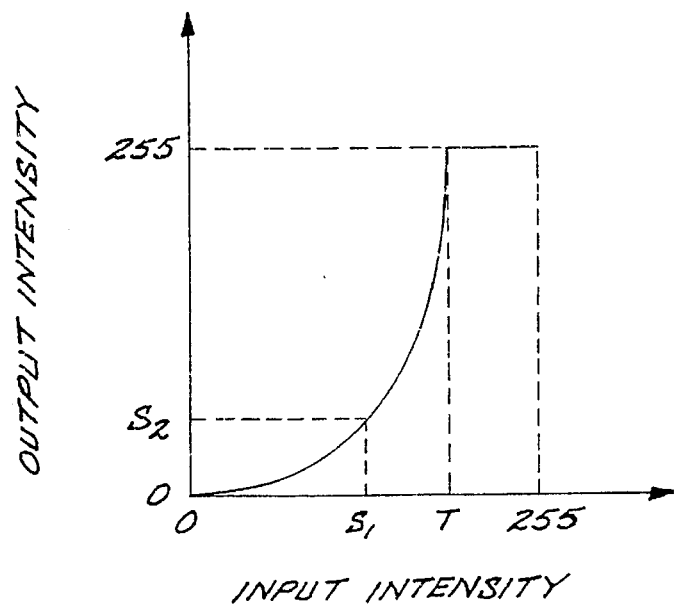
FIG. 1 is a plot of the output intensity as a function of input intensity for a known grey level intensity remapping function.
Figure 2:
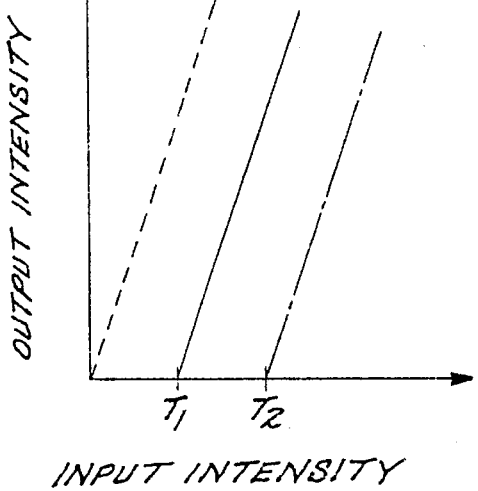
FIGS. 2 and 3 are respective plots of the respective output intensities as a function of input intensity for two known pseudo-color remapping functions.
Figure 3:
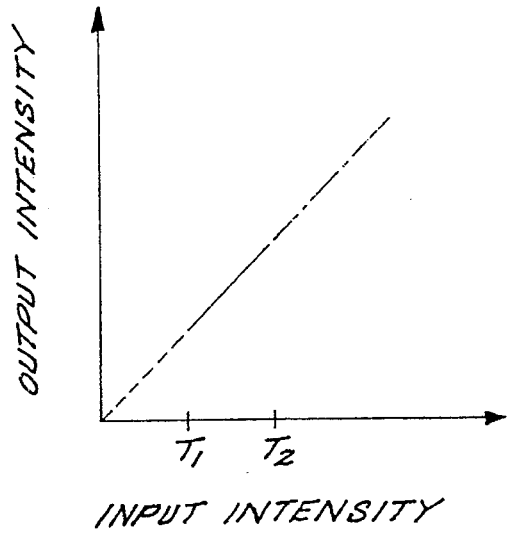
Figure 4:
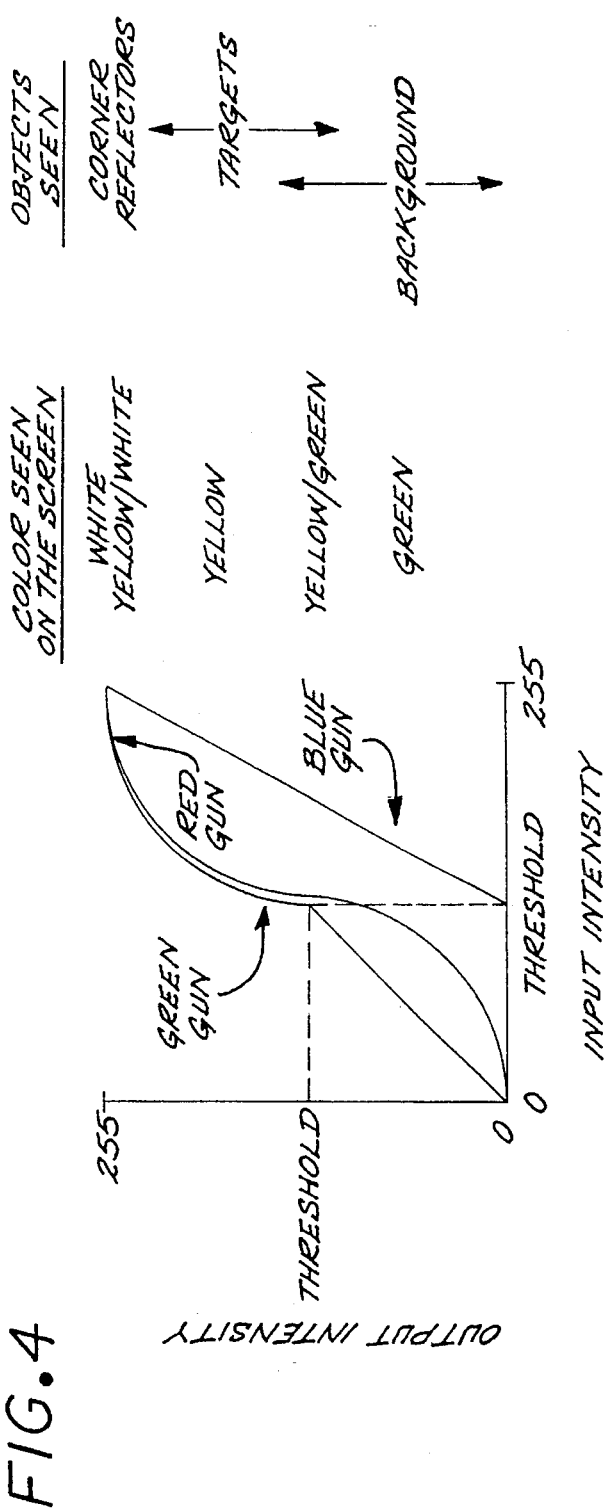
FIG. 4 is a plot of the respective color output intensities as a function of input intensity for a pseudo-color remapping function in accordance with the invention.

A pseudo-color display in accordance with the invention remaps the pixel intensity for each pixel of an image comprising a two-dimensional intensity map into a pseudo-color display in accordance with the remapping functions illustrated in FIG. 4. As the input intensity value for a given pixel increases from zero to the threshold value, the color of the output makes a gradual change from green to yellow. As the input values continue from the threshold value to the maximum intensity value (255 for an 8-bit intensity value) the output color transitions from yellow to white. If the threshold is selected properly, this set of color transitions gives a GYW pseudo-color (green-phosphor effect plus white for high intensity returns). Proper threshold selection will also make most of the image fall into the green region. From FIG. 4 it is clear that there is only one threshold for these pseudo-color remapping functions. The linear ramp of the green gun below the threshold value maintains background dynamic range. The linear ramp of the blue gun above the threshold value saves target detail.

Figure 5:
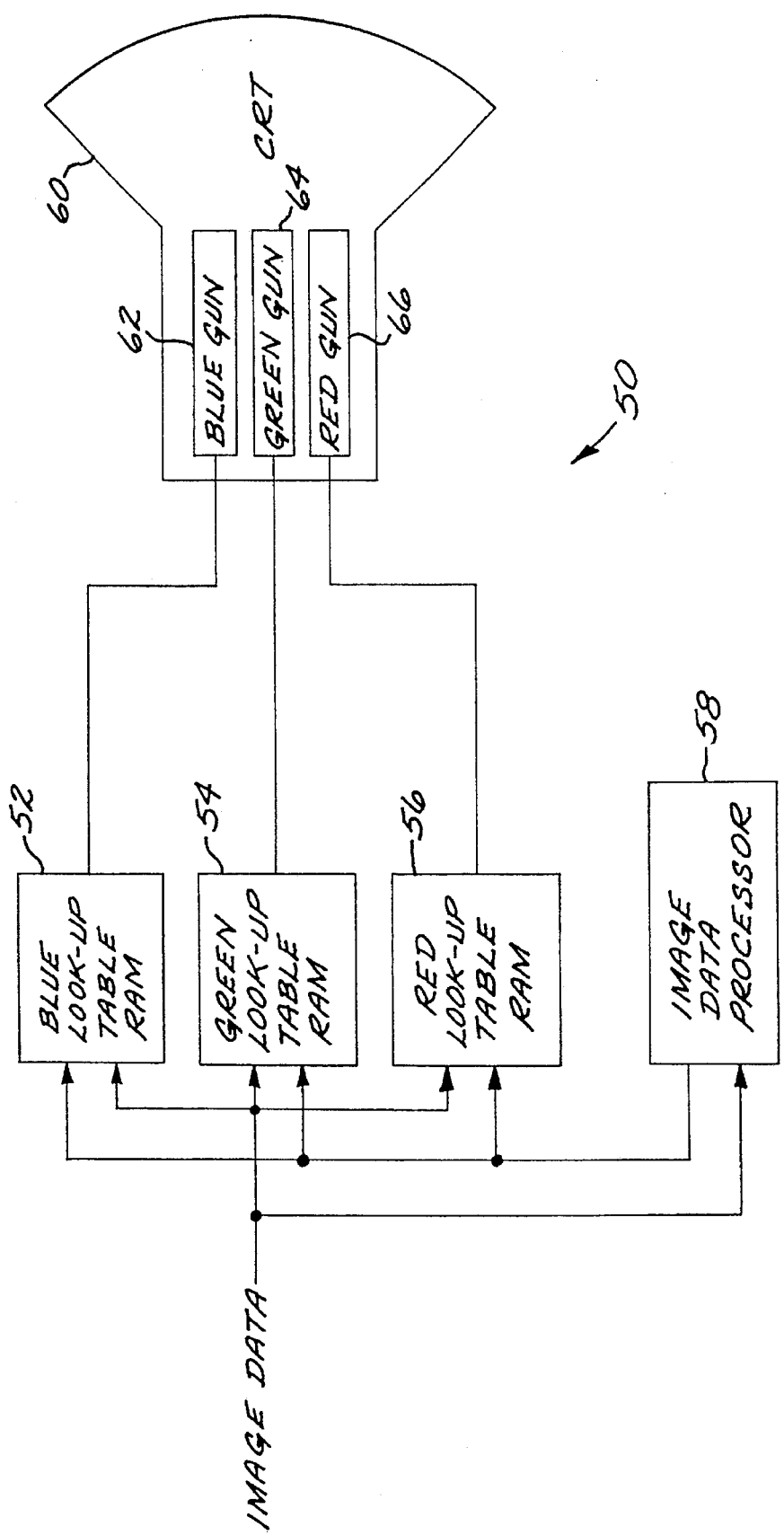
FIG. 5 is a simplified block diagram of a pseudo-color CRT display system embodying the invention.

FIG. 5 shows a general block diagram of a pseudo-color display system 50 embodying the invention. The input image data is digitized, and used to address three look-up table ("LUT") RAMS, the blue LUT RAM 52, the green LUT RAM 54 and the red LUT RAM 56. The function of the LUT RAMS 52, 54, and 56 is to remap the input image intensity data into the pseudo-color intensity values in accordance with the functions illustrated in FIG. 4. Thus, for each input intensity pixel value, the RAMs 52, 54 and 56 provide corresponding remapped values to drive the respective blue, green, and red guns 62, 64, 66 of the color CRT 60. The invention is not limited to use with CRT apparatus; other types of display apparatus may be employed which provide control over intensity and the red, green and blue colors.

The system 50 further comprises an image data processor 58 which functions to provide the pseudo-color table values to the RAMS 52, 54 and 56. In a simple display system the remapped values may simply be predetermined and stored in the respective RAMS as non-varying LUTs. However, more sophisticated systems may require that the threshold value for a particular image be selected in dependence on particular characteristics of the image. In that case, the image data processor 58 receives and analyzes the input image data, determines an appropriate threshold value, calculates the corresponding blue, green and red LUT values, and writes these values to the respective RAMS 52, 54 and 56.

An optimum threshold should be selected so that true targets are visually separated from trees, corner reflectors, and noise. It is desired to select the pseudo-color threshold so that most of the background appears in a color used for lower intensity output to the screen (green), while, for the most part, corner reflectors (usually the brightest object in an image), are seen at the saturation point in the upper end of the intensity range (white). The true targets will be spread out in a middle color (yellow), with a minimum amount of overlapping into the other two color regions. The choice of threshold is important in that it affects the viewer's ability to locate the targets quickly. If a threshold is selected that is too low, an unacceptable proportion of trees and noise will appear in the middle color region; the viewer may thus have difficulty distinguishing between true and false targets. If the threshold is set too high, many true targets will be interpreted as background.

To find a method for automatic threshold selection, some log detected SAR imagery grouped according to mode (the respective high resolution spotlight, low resolution spotlight and search modes) was analyzed. For each image, an optimum intensity threshold was chosen subjectively by viewing the effect of threshold changes on target clarity. In addition, the mean intensity and standard deviation or variance of intensities were recorded for each image.

Figure 6:
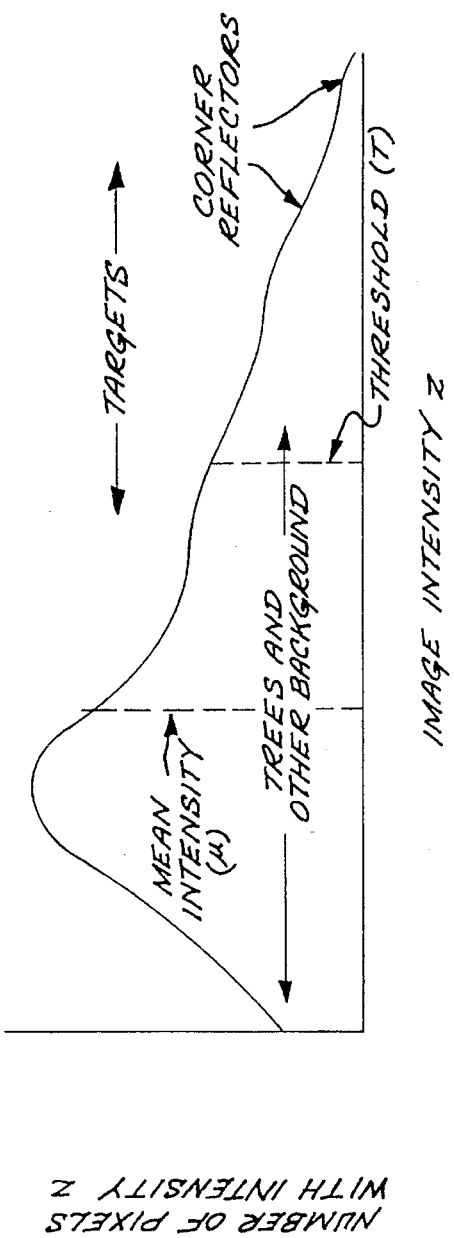
FIG. 6 plots the number of pixels of a given intensity as a function of image intensity for a typical image.

It is theorized that subjectively optimum thresholds can be estimated with a straight line function of mean and standard deviation. FIG. 6 plots the number of pixels having a given intensity z as a function of image intensity, illustrating the mean intensity level, the threshold (T), the intensity of trees and other background, targets, and corner reflectors. The threshold T is the sum of the mean intensity value and an increment value.

In effect, it is desired to plot these subjectively selected thresholds against mean and standard deviation and then draw a line of estimate which best fits this plotted data. Accordingly, the following three models are chosen for analysis:

Model 1) $T=\mu+\alpha_1+\epsilon$

Model 2) $T=\mu+\beta_1\sigma+\epsilon$

Model 3) $T=\mu+\beta_2\sigma+\alpha_2+\epsilon$

These models are constructed so that for a given image with a mean intensity $\mu$ and a standard (intensity) deviation $\sigma$, the corresponding subjective threshold T has an estimated value of one of the following:

$$1) \hat{T}=\mu+\alpha_1 \qquad (1)$$

$$2) \hat{T}=\mu+\beta_1\sigma \qquad (2)$$

$$3) \hat{T}=\mu+\beta_2\sigma+\alpha_2 \qquad (3)$$

The true value of T is its estimated value plus an error term $\epsilon$, where the error term is the difference between the subjective threshold T and the estimate for the corresponding mean and standard deviation. The mean intensity and the standard deviation (or square root of the variance) for the sample image can be calculated by the following relationships.

$$\mu=(1/P)\Sigma_i\Sigma_j x_{ij} \qquad (4)$$

$$\sigma=((1/P)(\Sigma_i\Sigma_j(x_{ij}-\mu)^2))^{1/2} \qquad (5)$$

The parameter P represents the number of pixels in the image. $X_{ij}$ represents the pixel intensity in row i and column j of the image. The parameters $\alpha_1$, $\beta_1$, $\alpha_2$, $\beta_2$ represent constants. The value of these parameters can be estimated using a least squares fit (also called "linear regression"). Using N as the number of images used for study, the following parameter estimates were derived.

For Model 1, the estimate of $\alpha_1$ is given by the average difference $a_1$ between the subjective threshold T and the mean, where i represents the image number and N is the total number of images:

$$a_1 = \frac{\Sigma_i (T_i - \mu_i)}{N}$$

For Model 2, $\beta_1$ is estimated by $b_1$:

$$b_1 = \frac{\Sigma_i \sigma_i (T_i - \mu_i)}{\Sigma_i \sigma_i^2}$$

Using linear regression for Model 3, the estimates of $\alpha_2$ and $\beta_2$ are given by:

$$b_2 = \frac{N \Sigma_i \sigma_i (T_i - \mu_i) - \Sigma_i \sigma_i \Sigma_i (T_i - \mu_i)}{N \Sigma_i \sigma_i^2 - (\Sigma_i \sigma_i)^2}$$

$$a_2 = \frac{\Sigma_i (T_i - \mu_i) - b_2 \Sigma_i \sigma_i}{N}$$

The two parameter estimates $a_2$ and $b_2$ can also be solved with a system of linear equations.

In order to choose which model gave the best threshold, two measures of threshold reliability are used: correlation coefficient, and mean squared error. In addition, hypothesis testing was used to determine if there was evidence to support Model 3.

Tests on one exemplary set of SAR log-detected data indicate that Model 3 should be used to determine the intensity threshold T for high resolution spotlight mode SAR data, and that Model 1 should be used to determine the intensity threshold for the low resolution spotlight and search modes of SAR data. The standard deviation may vary too much in a given search scene to be useful for threshold selection. However, the smaller field of view for the high resolution spotlight mode may restrict this variation. Model 3 may be useful if the threshold is either locally adaptive or computed over a "uniform" patch of ground.

To summarize one technique for estimating values for the values of the constants $\alpha_2$ and $\beta_2$ for model 3, a reference set of images, wherein the target position are known, is analyzed. The user varies the threshold (and hence the lookup tables) and finds a threshold that makes all of the known targets yellow (except the corner reflectors and other very high intensity returns). The mean intensity and standard deviation is calculated. This is repeated for each image in the reference image set. Generally, the larger the number of reference images analyzed to subjectively determine an optimum threshold value for each reference image, the better the resultant estimate of $\alpha_2$ and $\beta_2$. The values determined for the resultant thresholds $T_i$, means $\mu_i$ and standard deviations $\sigma_i$ can then be employed to estimate the constants $\alpha_2$ and $\beta_2$.

For Model 3, the resulting set of optimum thresholds can thus be estimated with a linear system of N equations, where $a_2$ and $b_2$ are estimates of $\alpha_2$ and $\beta_2$:

$$\begin{bmatrix} \hat{T}_1 \\ \hat{T}_2 \\ \cdot \\ \cdot \\ \cdot \\ \hat{T}_N \end{bmatrix} = \begin{bmatrix} \mu_1 \\ \mu_2 \\ \cdot \\ \cdot \\ \cdot \\ \mu_N \end{bmatrix} + \begin{bmatrix} \sigma_1 & 1 \\ \rho_2 & 1 \\ \cdot & \cdot \\ \cdot & \cdot \\ \cdot & \cdot \\ \sigma_N & 1 \end{bmatrix} \begin{bmatrix} b_2 \\ a_2 \end{bmatrix}$$

It is believed that the estimated values of $\alpha$, $\beta$ derived for data of a particular radar mode and sensor resolution should be workable values to use for any image of a particular radar mode and for a particular sensor resolution. Accordingly, the reference steps described above to determine the constant values need not be repeated, so long as the system is displaying images of the same radar mode from a sensor of the same resolution.

The function of the processor 58 is to provide to the RAMs 52, 54, 56 the look-up tables for the particular image. The look-up tables can be calculated with an automatically selected threshold value from the image data, as described above. The automatic selection is based on the subjectively chosen threshold values for the reference image data. The particular image data is then processed to determine the mean and variance of the data, which values, together with the previously determined constant values, are then used to calculate the estimated threshold value to be used for the particular image, in accordance with the particular model (1, 2 or 3). From the estimated threshold, the lookup tables are calculated in accordance with the following relationships:

For input intensity values x below the threshold T (0<x<T), the output intensity values y for the CRT color guns are $$y_{blue} = 0$$

$$y_{green} = x$$

$$y_{red} = -((x-T)(-T)^{2M-1})^{1/(2M)} + T$$

For input intensity values x greater than or equal to the threshold (T≤x<S where S is the maximum saturation intensity, 255 for an 8-bit value), the output values are $$y_{blue} = S((x-T)/(S-T))$$

$$y_{green} = ((x-T)(S-T)^{2M-1})^{1/(2M)} + T$$

$$y_{red} = ((x-T)(S-T)^{2M-1})^{1/(2M)} + T$$

2 M is the order of the polynomial that creates the shape of the curve in FIG. 4. M was set to three for the radar modes discussed above. For other types of data, i.e., data which is not log-detected, another value for M may be required. The polynominal order controls the rate of transition from one color to the next. As the order of the polynomial increases, the dynamic range of the yellow color (targets) is increased. Different rates can be employed to transition from green to yellow then from yellow to white.

Figure 7:
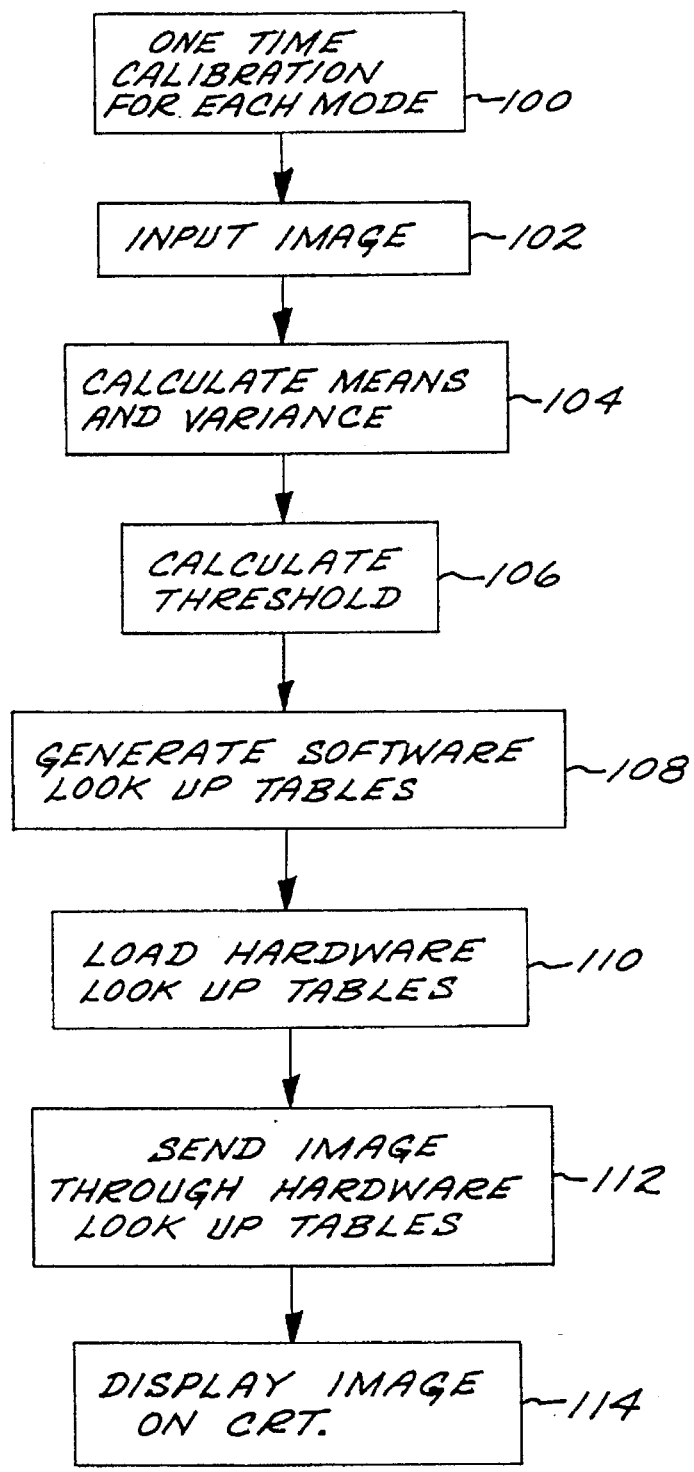
FIG. 7 is a simplified flow diagram illustrative of the operation of the display system of FIG. 5.

The functions carried out by the processor 58 during such an automatic selection of the threshold are depicted in the simplified flow diagram of FIG. 7. The calibration to determine the constants $\alpha$ and $\beta$ is conducted at step 100. Thereafter, the image data is input to the processor 58 at step 102. The processor calculates the mean and variance values from the data (step 104). From this data the threshold T is calculated using, e.g., one of the relationships of eqs. (1–3) (step 106), and the look-up tables are then generated (step 108), which map the input intensity values into corresponding values for each of the blue, green and red CRT guns 62, 64 and 66. The processor 58 then loads the look-up tables into the respective RAMS 52, 54 and 56 (step 110). After the look-up tables have been loaded into the RAMS 52, 54 and 56 (step 110), the RAMS are enabled to use the image data to address the look-up tables (step 110), and the corresponding stored table values are used to drive the guns 62, 64 and 66 to display the image on the CRT 60 (steps 112 and 114).

It is understood that the above-described embodiment is merely illustrative of the possible specific embodiments which may represent principles of the present invention. Other arrangements may readily be devised in accordance with these principles by those skilled in the art without departing from the scope of the invention.

What is claimed is:

1. Apparatus for display of input image data employing pseudo-color remapping to enhance image interpretation, comprising:

a color display apparatus responsive to red, green and blue intensity control signals;

means responsive to the input image data for remapping the respective input data for each pixel comprising the input image into respective red, blue and green intensity control signals in accordance with respective nonlinear red, blue and green intensity functions dependent on a single threshold value, and wherein said means responsive to the input image data remaps the input intensity data values x into corresponding output intensity values y in accordance with the following relationships:

for values of x greater than zero but less than the threshold value T $$y_{blue}=0$$

$$y_{green}=x$$

$$y_{red}=-((x-T)(-T)^{2M-1})^{(1/2M)}+T,$$

and for values of x greater than or equal to the threshold value T $$y_{blue}=S((x-T)/(S-T))$$

$$y_{green}=((x-T)(S-T)^{2M-1})^{1/(2M)}+T$$

$$y_{red}=((x-T)(S-T)^{2M-1})^{1/(2M)}+T$$

where S represents the maximum saturation intensity value and M is related to the order of the polynomial function defining remapping functions;

said color display apparatus responsive to said red, green and blue display control signals to display the image in pseudo-color.

2. The apparatus of claim 1 wherein remapping functions and the threshold value are selected such that the image background is displayed as green, lower intensity targets are displayed in yellow, with corner reflectors and other very high intensity targets displayed in white.

3. The apparatus of claim 1 wherein said means responsive to the input image data comprises:

a first memory means for storing a blue look up table of blue display control signal values, each corresponding to a particular input pixel intensity value;

a second memory means for storing a green look up table of green display control signal values, each corresponding to a particular input pixel intensity value; and a third memory means for storing a red look up table of red display control signal values, each corresponding to a particular input pixel intensity value.

4. The apparatus of claim 1 wherein said input image data comprises log-detected synthetic aperture radar image data, and the value of M is selected to be three.

5. The apparatus of claim 1 wherein said color display apparatus comprises a color cathode ray tube device having respective red, green and blue guns.

6. The apparatus of claim 1 wherein a green remapping function comprises a linear ramp relationship for input intensity values between zero and said threshold value, and is a nonlinear relationship for input intensity values between the threshold values and the maximum intensity value, said linear ramp below the threshold value serving to maintain background dynamic range.

7. The apparatus of claim 6 wherein the output intensity resulting from a blue remapping function is zero for input intensity values between zero and said threshold value, and is a linear ramp function of the input intensity value from the threshold value to the maximum intensity value, said blue function linear ramp function above the threshold value serving to preserve target detail.

8. The apparatus of claim 7 wherein the output intensity resulting from a red remapping function is a nonlinear function of the input intensity value for input intensity values between zero and the maximum intensity value.

9. The apparatus of claim 2 further comprising an image data processor responsive to the input image data for adaptively selecting the threshold value in dependence on predetermined characteristics of the image.

10. The apparatus of claim 9 wherein said predetermined characteristics of the image include the mean pixel intensity $\mu$ and the standard deviation $\sigma$ of the pixel intensity.

11. The apparatus of claim 10 wherein said threshold value T is calculated in accordance with the relationship $$T=\mu+\beta\sigma+\alpha$$

where $\alpha$ and $\beta$ are constants.

12. The apparatus of claim 11 wherein the image data comprises log-detected synthetic aperture radar data.

13. A method for displaying input image data on color display apparatus responsive to red, green and blue intensity control signals, employing pseudo-color remapping to enhance image interpretation, comprising the steps of:

remapping the respective input data for each pixel comprising the input image into respective red, blue and green intensity control signals in accordance with respective nonlinear red, blue and green intensity functions dependent on a single threshold value, wherein said remapping step comprises remapping the input intensity data values x into corresponding output intensity values y in accordance with the following relationships:

for values of x greater than zero but less than the threshold value T $$y_{blue}=0$$

$$y_{green}=x$$

$$y_{red}=-((x-T)(-T)^{2M-1})^{(1/2M)}+T,$$

and for values of x greater than or equal to the the threshold value T $$y_{blue}=S((x-T)/(S-T))$$

$$y_{green}=((x-T)(S-T)^{2M-1})^{1/(2M)}+T$$

$$y_{red}=((x-T)(S-T)^{2M-1})^{1/(2M)}+T$$

where S represents the maximum saturation intensity value and M is related to the order of the polynomial function defining remapping functions;

sending said red, green and blue display control signals to the color display apparatus to display the image in pseudo-color.

14. The method of claim 13 wherein remapping functions and the threshold value are selected such that the image background is displayed as green, lower intensity targets are displayed in yellow, with corner reflectors and other very high intensity targets displayed in white.

15. The method of claim 13 wherein said remapping step comprises:

storing a blue look up table of blue display control signal values in a first memory, each value corresponding to a particular input pixel intensity value;

storing a green look up table of green display control signal values in a second memory, each value corresponding to a particular input pixel intensity value; and storing a red look up table of red display control signal values in a third memory, each value corresponding to a particular input pixel intensity value.

16. The method of claim 13 wherein said color display apparatus comprises a color cathode ray tube device having respective red, green and blue guns.

17. The method of claim 13 wherein a green remapping function comprises a linear ramp relationship for input intensity values between zero and said threshold value, and is a nonlinear relationship for input intensity values between the threshold values and the maximum intensity value, said linear ramp below the threshold value serving to maintain background dynamic range.

18. The method of claim 13 wherein a blue remapping function sets the blue intensity control signal to zero for input intensity values between zero and said threshold value, and is a linear ramp function of the input intensity value from the threshold value to the maximum intensity value, said blue function linear ramp function above the threshold value serving to preserve target detail.

19. The method of claim 13 wherein the red intensity control signal is a nonlinear function of the input intensity value for input intensity values between zero and the maximum intensity value.

\* \* \* \* \*